United States Patent
Lewis (10) Patent No.: US 7,259,662 B2
(45) Date of Patent: Aug. 21, 2007

(54) PHOTOELECTRIC OPERATOR POSITION DETECTOR

(75) Inventor: Robert J. Lewis, Binghamton, NY (US)

(73) Assignee: The Raymond Corporation, Green, NY (US)

(*) Notice: Subject to any disclaimer, the term of this patent is extended or adjusted under 35 U.S.C. 154(b) by 183 days.

(21) Appl. No.: 11/143,794

(22) Filed: Jun. 2, 2005

(65) Prior Publication Data
US 2005/0270147 A1 Dec. 8, 2005

Related U.S. Application Data

(60) Provisional application No. 60/576,097, filed on Jun. 2, 2004.

(51) Int. Cl.
*B60Q 1/00* (2006.01)

(52) U.S. Cl. .................... 340/439; 340/573.1; 340/576

(58) Field of Classification Search ................ 340/438, 340/439, 471, 479, 573.1, 576, 665; 180/271, 180/272, 273, 274, 275; 301/191
See application file for complete search history.

(56) References Cited

U.S. PATENT DOCUMENTS

| 3,507,350 | A | | 4/1970 | Boyajian |
| 4,840,248 | A | | 6/1989 | Silverman |
| 5,272,187 | A | * | 12/1993 | Gross et al. ................ 523/402 |
| 5,835,008 | A | * | 11/1998 | Colemere, Jr. .............. 340/439 |
| 6,137,398 | A | | 10/2000 | Dunlap et al. |
| 6,474,753 | B1 | * | 11/2002 | Rieth et al. ................. 303/191 |

FOREIGN PATENT DOCUMENTS

WO    WO98/09910 A    3/1998

* cited by examiner

*Primary Examiner*—Van T. Trieu
(74) *Attorney, Agent, or Firm*—Quarles & Brady (57) ABSTRACT

A method and apparatus for reinforcing the training received by an operator of a material handling vehicle to maintain the operator's feet and legs in the operator compartment includes a first and second photoelectric beam extending across the entry to the compartment. When a deadman brake is released and the vehicle is commanded to move or is actually moving, the detectors sense the presence of objects extending through the entry. When objects are sensed, a vehicle brake can be applied, a visual or audio sensor can be activated, or the detected fault can be stored in memory. The faults can be used by a supervisor to calculate an operator rating.

18 Claims, 4 Drawing Sheets

PHOTOELECTRIC OPERATOR POSITION DETECTOR

CROSS-REFERENCE TO RELATED APPLICATION

This application claims priority to provisional application U.S. Ser. No. 60/576,097, filed Jun. 2, 2004, which is hereby incorporated by reference.

BACKGROUND OF THE INVENTION

The present invention is related to material handling vehicles, and more particularly to a method and apparatus to reinforce the training provided to an operator of a material handling vehicle to maintain a proper position in an operator compartment while driving the vehicle.

Employers are required by OSHA standards (29 C.F.R. 1910.178(1)) to train operators of material handling vehicles in safe operation of the vehicle. The training includes instructing the operator to maintain his or her feet and legs inside of the vehicle compartment while operating the vehicle. These regulations also require the employer to prohibit operators from placing their legs outside the running lines of the vehicle.

Electromechanical and photoelectrical systems are available for producing an alarm or alert signal when an object extends into or out of the operator compartment of the vehicle while the vehicle is in use, and therefore to provide an indicator when a leg or foot is extended out of the vehicle.

One example of an electromechanical system for monitoring an operator in a material handling vehicle is disclosed, for example, in U.S. Pat. No. 6,137,398 to Dunlap. Here, an electromechanical actuator is provided across the entrance to an operator compartment. An alert signal is generated when a portion of the operator's body engages the actuator, alerting the operator when a portion of the operator's body is extending outside of the operator compartment.

A photoelectric system is disclosed in U.S. Pat. No. 4,840,248 to Silverman. Here, a photoelectric light source and corresponding detector are positioned across the entrance to an operator cab, and are activated whenever power is applied to the vehicle. When an object extends into or out of the cab of the vehicle, the beam between the source and the detector is broken, and an alarm is generated. The alarm can be a visual or audio signal to the operator, or power can be cut off to the vehicle to force the vehicle to stop. The alarm is activated whenever the operator leaves the compartment and is also used to brake the vehicle when the operator exits.

These prior art systems, however, suffer from disadvantages which make them unsuitable for either training or reinforcing the training of an operator. Both the electromechanical and photoelectric prior art systems, for example, activate the sensors whenever power is applied to the vehicle. An alarm is generated, therefore, not only when an actual fault condition has been detected, but also whenever the operator intentionally enters or leaves the vehicle. Therefore, alarm conditions are not consistently tied to actual "fault" conditions, but rather are frequently encountered in normal operation. After a period of time, therefore, operators may become immune to signals produced by these systems, and begin to ignore actual fault conditions. These devices, therefore, have limited usefulness in training or reinforce the training of operators to properly maintain a position within the vehicle.

There remains a need, therefore, for a system capable of providing alarm and alert signals to an operator which are useful in reinforcing training to maintain the feet and legs inside of the vehicle while in use.

SUMMARY OF THE INVENTION

In one aspect of the invention, a method to reinforce the training provided to an operator of a material handling vehicle to maintain the operator's feet and legs in the vehicle is provided. The method comprises the steps of mounting an emitter and a corresponding detector across an entry to the operator compartment, monitoring the deadman brake to determine when the deadman brake has been released to allow travel of the vehicle, and determining whether the material handling vehicle has received a command to begin travel. When the deadman brake is released and a travel request has been received, the detector to is monitored determine whether an object is extending between the emitter and the detector. A response sequence is activated when the vehicle is operational and the detector indicates that an object has been detected. Therefore, the operator is alerted to fault conditions only when the vehicle is in use.

In another aspect of the invention, the operator is prompted to include an operator identifier, and the response sequence includes associating the fault occurrence with the operator identifier. Based on the stored fault occurrence data, an operator rating for can be determined by supervising personnel.

In yet another aspect of the invention, a second emitter and a second detector are mounted across the entrance to the compartment, offset a distance above the emitter and detector. The first emitter and detector can, for example, be mounted adjacent a floor of the compartment in a position selected to detect a toe or foot of the operator, and the second emitter and detector can be mounted above the floor of the compartment in a position selected to detect a leg of the operator.

In still another aspect of the invention, a method is provided to reinforce the training provided to an operator of a material handling vehicle to maintain the operator's feet and legs in the vehicle. The method comprises the steps of mounting a first emitter and a first corresponding detector adjacent a floor of the operator compartment to produce a first light beam across an entry to an operator compartment substantially at the floor level. A second emitter and detector is also mounted across the entry to the operator compartment to produce a second light beam. The second light beam is positioned above the first light beam at a position selected to detect a leg of the operator. A deadman brake is monitored and, when the deadman brake has been released to allow travel of the vehicle and the material handling vehicle has received a command to begin travel, the first and second detectors are monitored to determine whether an object is extending between at least one of the first emitter and the first detector or the second emitter and the second detector. The number of faults detected during operation are used to provide a rating of the operator.

In yet another aspect of the invention, a material handling vehicle is provided. The material handling vehicle includes an operator compartment, a deadman brake, a switch for deactivating the deadman brake, and an emitter and a detector. The emitter and detector are coupled to opposing sides of an opening to the operator compartment and are aligned such that a beam emitted by the emitter is received by the detector unless broken by an object extending through the opening. A traction motor is provided for driving the vehicle and is adapted to provide a feedback signal indicating that the material handling vehicle is moving. The vehicle further includes a vehicle control system and a control handle for providing a travel request signal to the vehicle control system to drive the traction motor. The vehicle control system is coupled to the switch to receive a signal indicating that the deadman brake is to be deactivated, to the traction motor for receiving the feedback signal, and to the control handle for receiving the travel request signal. The vehicle control system is programmed to monitor an output of the detector when the deadman brake is deactivated, and at least one of the travel request signal and the feedback signals is active, and to institute a response when the output of the detector indicates that the beam is broken.

These and still other advantages of the invention will be apparent from the detailed description and drawings. While a particular preferred embodiment has been disclosed hereafter, it should be recognized that the invention is not so limited. Rather, the claims should be looked to in order to judge the full scope of the invention.

DETAILED DESCRIPTION OF THE PREFERRED EMBODIMENT

Figure 1:
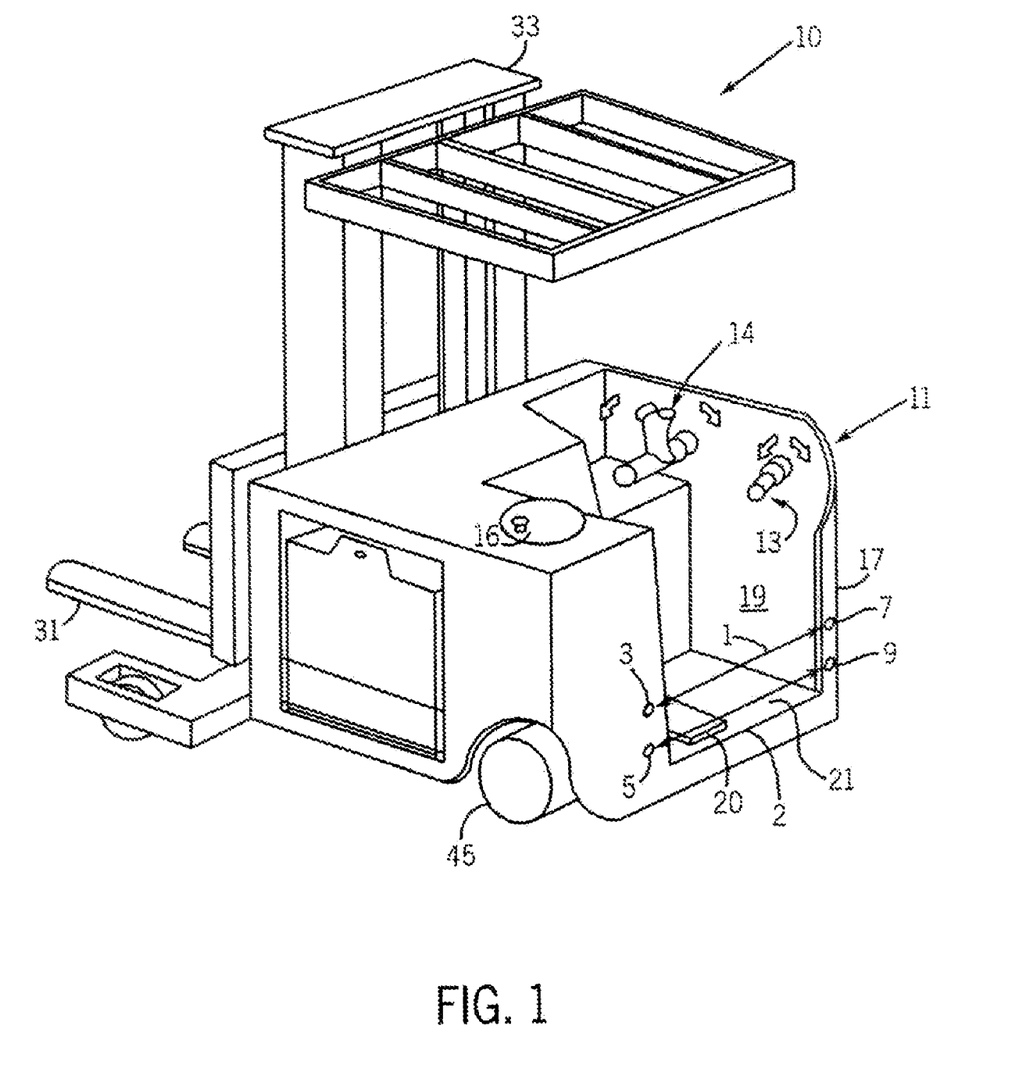
FIG. 1 is a perspective view of a lift truck constructed in accordance with one embodiment of the invention.

Referring now to the Figures, and more particularly to FIG. 1, a material handling vehicle 10 constructed in accordance with the present invention is shown. The truck 10 includes an operator compartment 11 comprising an enclosure 17 with an opening 19 for entry and exit of the operator. The compartment 11 include a control handle 14 which is mounted to the enclosure 17 at the front of the operator compartment 11 proximate the forks 31, and a floor switch 20 positioned on the floor 21 of the compartment 11. A steering wheel 16 is also provided in the compartment 11. First and second light beams 1 and 2, each extending from an infrared source 3 and 5, respectively, to a corresponding infrared detector, 7 and 9, respectively, are provided across the opening 19 of the operator compartment 11, as described more filly below. Although the material handling vehicle 10 as shown is a standing, fore-aft stance operator configuration lift truck, it will be apparent to those of skill in the art that the present invention can also be provided in a side stance truck, or in other truck configurations.

Figure 2:
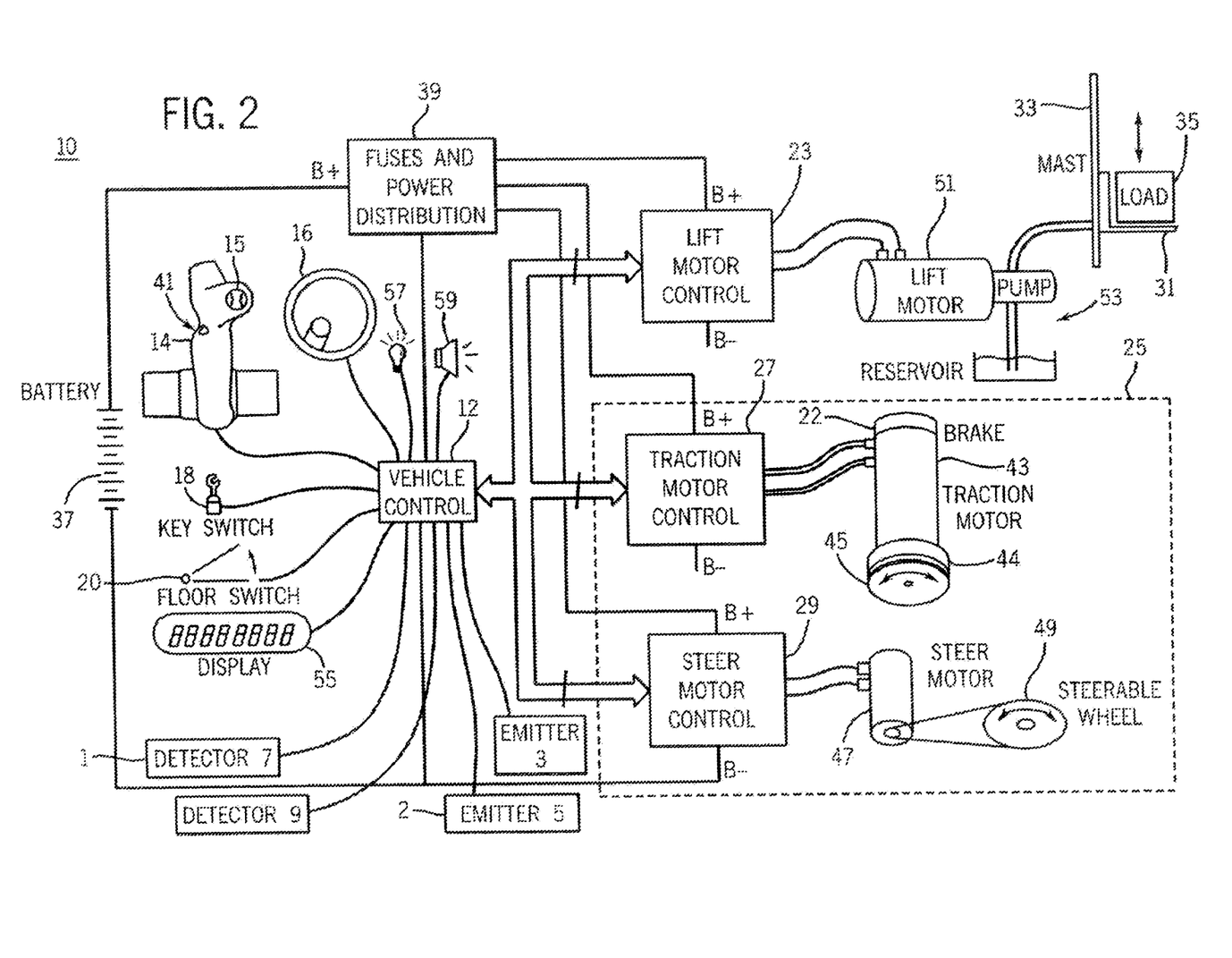
FIG. 2 is a block diagram of a lift truck constructed in accordance with the invention.

Referring now to FIG. 2, a block diagram of a typical lift truck 10 in which the present invention can be provided is illustrated. The lift truck 10 comprises a vehicle control system 12 which receives operator input signals from the operator control handle 14, the steering wheel 16, a key switch 18, and the floor switch 20 and, based on the received signals, provides command signals to each of a lift motor control 23 and a drive system 25 including both a traction motor control 27 and a steer motor control 29. The drive system 25 provides a motive force for driving the lift truck 10 in a selected direction, while the lift motor control 23 drives forks 31 along a mast 33 to raise or lower a load 35, as described below. The lift truck 10 and vehicle control system 12 are powered by one or more battery 37, coupled to the vehicle control system 12, drive system 25, steer motor control 29, and lift motor control 23 through a bank of fuses or circuit breakers 39.

As noted above, the operator inputs include a key switch 18, floor switch 20, steering wheel 16, and an operator control handle 14. The key switch 18 is activated to apply power to the vehicle control system 12, thereby enabling the lift truck 10. The floor switch 20 provides a signal to the vehicle control system 12 for operating the brake 22 to provide a deadman braking device, disabling motion of the vehicle unless the floor switch 20 is activated by the operator. Light emitters or sources 3 and 5 and associated detectors 7 and 9 are also coupled to the vehicle control system 12. As described above, the source and detector pairs (3, 7; 5, 9) produce light beams 1 and 2, respectively, extending across the entry 19 to the operator compartment 11.

The operator control handle 14 provides a travel request signal to the vehicle control system 12. Typically, the handle 14 is rotated in a vertical plane to provide a travel direction and speed command of motion for the lift truck 10. A four-way switch 15 located on the top of the handle 14 provides a tilt up/down function when activated in the forward and reverse directions and a sideshift right and left function when activated to the right and left directions. A plurality of control actuators 41 located on the handle 14 provide a number of additional functions, and can include, for example, a reach push button, a retract push button, and a horn push button as well as a potentiometer providing a lift function. A number of other functions could also be provided, depending on the construction and intended use of the lift truck 10.

The traction motor control 27 drives one or more traction motor 43 which is connected to wheel 45 to provide motive force to the lift truck. The speed and direction of the traction motor 43 and associated wheel is selected by the operator from the operator control handle 14, and is typically monitored and controlled through feedback provided by a speed sensor 44 which can be an encoder or other feedback device coupled to the traction motor 43. The wheel 45 is also connected to friction brake 22 through the traction motor 43, to provide both a service and parking brake function for the lift truck 10. The friction brake 22 can be a spring-activated brake that defaults to a "brake on" position, such that the switch 20 and associated brake 22 therefore provide the deadman braking function. The operator must provide a signal indicating that the deadman brake is to be released to drive the tick, here provided by the floor switch 20, as described above. The traction motor 43 is typically an electric motor, and the associated friction brakes 22 can be either electrically operated or hydraulically operated devices. Although one friction brake 22, motor 43, and wheel 45 are shown, the lift truck 10 can include one or more of these elements.

The steer motor control 29 is connected to drive a steer motor 47 and associated steerable wheel 49 in a direction selected by the operator by rotating the steering wheel 16, described above. The direction of rotation of the steerable wheel 49 determines the direction of motion of the lift truck 10.

The lift motor control 33 provides command signals to control a lift motor 51 which is connected to a hydraulic circuit 53 for driving the forks 31 along the mast 33, thereby moving the load 35 up or down, depending on the direction selected at the control handle 14. In some applications, the mast 33 can be a telescoping mast. Here, additional hydraulic circuitry is provided to raise or lower the mast 33 as well as the forks 31.

In addition to providing control signals to the drive system and lift control system, the vehicle control 12 can also provide data to a display 55 for providing information to the operator, and activate both light indicators 57 and audio indicators 59 to indicate fault conditions to the operator. Information provided on the display 55 can include, for example, a weight of a load placed on the forks 31, the speed of the vehicle, the time, or maintenance information. Furthermore, fault conditions detected by the detectors 7 and 9, as described below, can also be indicated on display 55. The display 55 can provide an interactive interface, allowing the operator to enter identifying information, such as an operator name or employee number, for use in calculating a number of faults encountered by a given operator driving the vehicle, as described below.

Referring again to FIGS. 1, 2, and 3, in operation, objects extending through the entrance 19 to the operator compartment 11 are detected when the light beams 1 and 2 are broken by the object. When the object extends between a source 3 or 5 and the associated detectors 7 or 9, the light beam is broken, the detector 7 or 9 provides a signal to the vehicle control system 12, as described more fully below. Light beams 1 and 2, which, as shown in the figures, are disposed more or less horizontally across the entry to the operator's compartment 19. The light produced by sources 3 and 5 can be modulated to a pattern, comprising a pulse mark-space ratio where the light source is alternately turned on and off, at a high rate. The detectors 7 and 9 can be similarly tuned to this pattern to limit response to other light sources. The pattern timing and frequency can also be chosen to eliminate possible false signals from ambient light such as fluorescent, HID, etc. Obstruction of the beam is detected by the truck control system 12 according to an algorithm (FIG. 4), and an appropriate response, as described below, ensues if the conditions of the algorithm are met. In general terms, the beam 1 or 2 is broken or interrupted and a fault condition occurs when an object is positioned in the path of the beam between the source and the corresponding detector, either continuously or transitorily.

Figure 3:
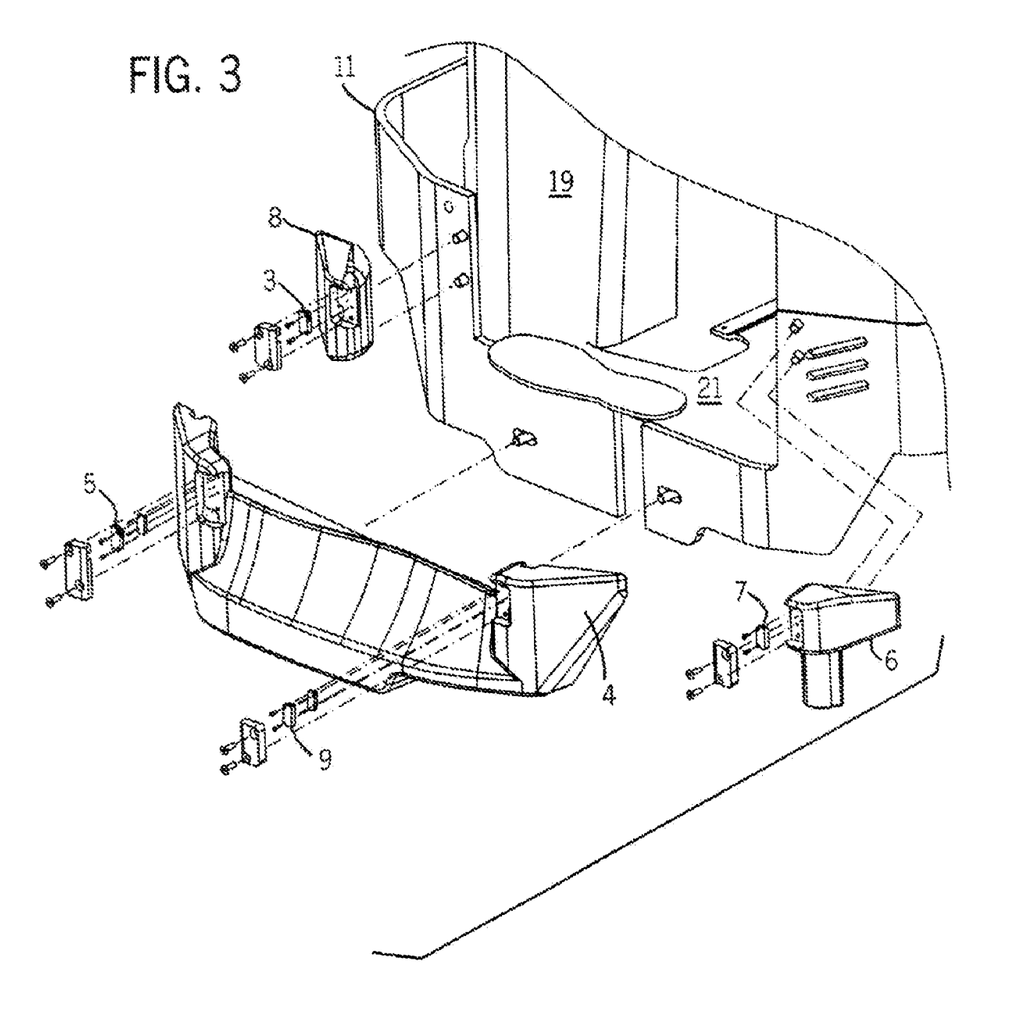
FIG. 3 illustrate the operator's compartment and the position of the emitter and sensor in the operator's compartment.

Referring still to FIGS. 1, 2 and also to FIG. 3, the sources 3 and 5 and associated detectors 7 and 9 are provided in pairs across the entrance 19 of the operator compartment 11 of the lift truck 10 to detect the position of the operator or other objects extending into or out of the compartment 19. The source 5 and detector 9 are mounted in a housing 4 provided adjacent the floor 21 of the compartment 19, while the mounted to individual housings 6 and 8 provided along the sides of the entrance 19.

The light beam 1 produced by source 5 is projected across the opening 19 adjacent the floor 21 of the compartment 11, preferably approximately 0.75" above the plane of the floor 21, and is positioned particularly to detect the operator's toe or heel, if it is positioned improperly beyond the prescribed boundary. The output of detector 9 is fed to the vehicle control system 12 which, after a signal is received from the detector 9, analyzes the length of time the light beam 1 has been interrupted. Interruptions below a predetermined time are ignored, reducing false triggers that could be caused, for example, by debris moving around the operator compartment floor, while still reliably detecting an operator's foot or other objects extending beyond the prescribed area. While a range of the time periods can be used, depending particularly on operating conditions, a two hundred millisecond delay has been experimentally shown to eliminate most false triggers.

The light beam 2 is positioned particularly to detect static or transitory presence of the operator's leg or calf extending improperly beyond the confines of the operator compartment 19. The light beam 2, and associated emitter 3 and detector 7, are located in a range of about six to nine inches above the floor 21, and preferably at a height of approximately eight inches above the floor plane 21. This height has been shown to consistently detect fault conditions, and to prevent operators from stepping or jumping over the beam 2. Here, again, the vehicle control system 12 receives a signal from the detector 7 and institutes a delay to filter false triggers. A quicker detection time of about forty milliseconds has been shown experimentally to be appropriate for this purpose. Under these conditions, the vehicle control system 12 will detect a rapidly moving leg or calf, and institute a response quickly, as described below.

Prior to operation of the lift truck 10, the operator can initially be prompted to enter an operator identifier such as a name, operator number, employee number, or other identifier into the vehicle control system 12 through the user display 55 or using other methods known in the art. The vehicle control system 12 can then store this identifier in memory and associate driving information with the operator as described below to provide an operator rating. Other types of identifiers could also be used.

Figure 4:
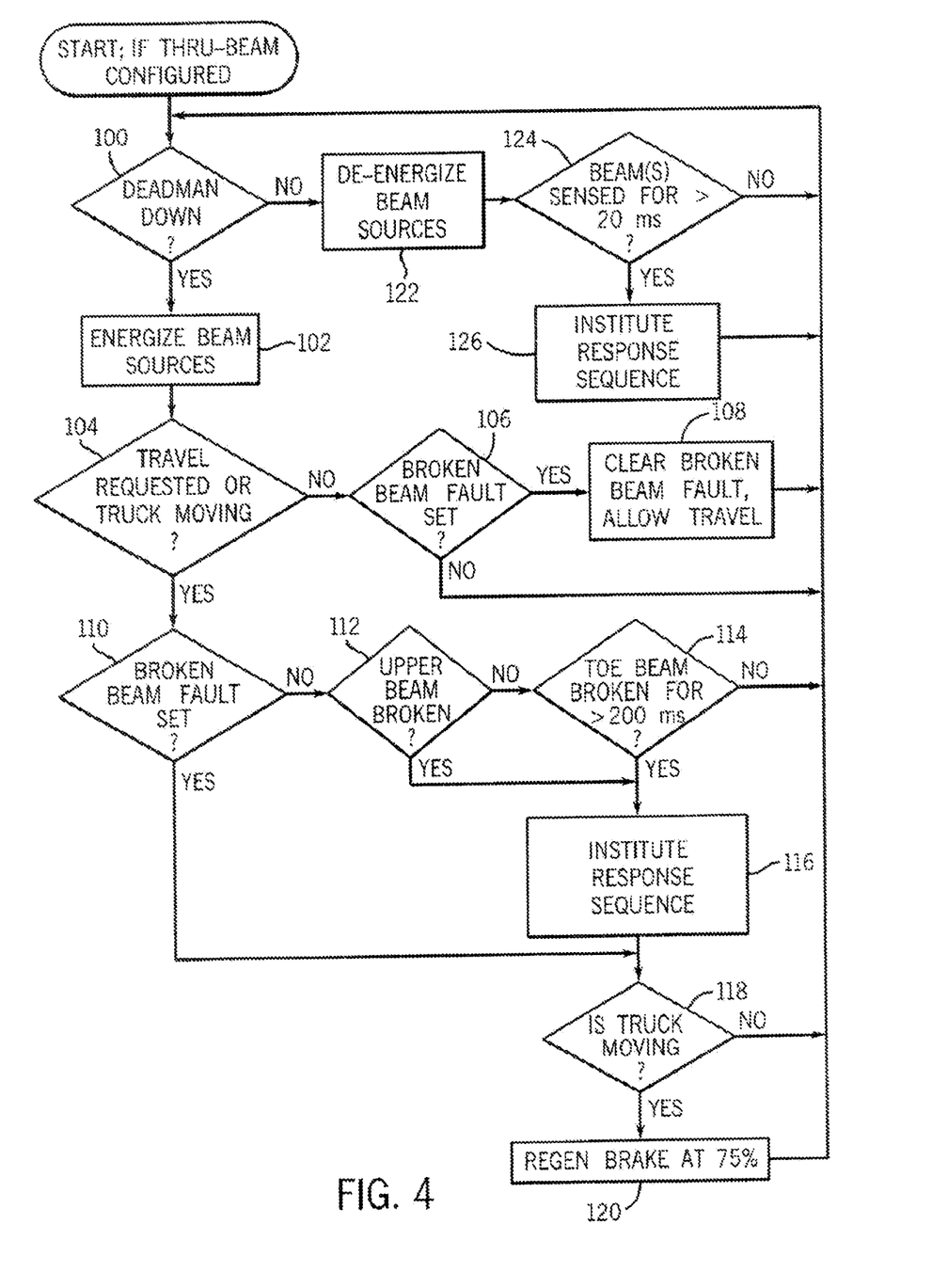
FIG. 4 is a flow chart illustrating an algorithm for determining the position of the operator and for selectively inhibiting movement of the truck based on the position of the deadman switch and a determination that the operator has crossed the line between the emitter and the detector.

Referring now to FIG. 4, in operation, the floor switch 20 is monitored by the vehicle control system 12 to determine whether an operator has requested release of the deadman brake (step 100). When the floor switch 20 is activated, the brake 22 is deactivated, and an operator intends to drive the truck, the emitters 3 and 5 producing light beams 1 and 2 are activated or energized by the control system 12 (step 102). The vehicle control system 12 then determines whether travel has been requested, or if the truck is moving (step 104) by determining whether a travel request command has been issued by control handle 14 or feedback is received from the traction motor 43. If not, the vehicle control system 12 determines whether a broken beam has been detected and a fault condition has been set (step 106), indicating that continuity between either of the sources 3 and 5 and associated detectors 7 and 9 has been broken. If so, the broken beam fault is cleared (step 108), travel is allowed, and the vehicle control system 12 returns to monitoring the deadman 20 (step 100). If not, the vehicle control system 12 takes no action and returns to monitor the deadman 20 (step 100).

If travel has been requested or feedback indicates that the lift truck 10 is moving, the vehicle control system 12 determines whether either beam 1 or beam 2 has been broken, indicating a broken beam fault condition (step 110). If the broken beam fault is not set, each of the detectors 7 and 9, are checked to determine if the respective light beam 1 or 2 has been broken. The upper set (3; 7) is checked first (step 112), and if a fault has occurred, a delay is instituted for a period of about forty milliseconds, to filter any false triggers. If the fault remains active through the forty millisecond period, a fault condition is set and a response sequence is initiated (step 116). If the upper detector 7 does not indicate that the beam 1 has been broken, the vehicle control system 12 determines if the lower beam 2 has been broken, again, continuously for a period of time, here selected as 200 milliseconds (step 114). If so, again, a fault is set and a response sequence is initiated (step 116). The response sequence can include inhibiting travel, limiting the speed of the truck 10, activating an audio or visual alarm, or storing the occurrence of the fault condition in the vehicle control system 12. When the response sequence includes inhibiting travel, the fault is set, and the truck is moving (step 118), regenerative braking (step 120) is applied to the truck at a rate determined experimentally to produce a smooth stop, irrespective of the weight of any load on the vehicle.

When the switch 20 is inactive such that the brake 22 is applied, the emitters 3 and 5 are de-energized by the control system 12. When the emitters are de-energized (step 122), the vehicle control system 12 continually monitors the detectors 7 and 9 to determine whether either of the beams 1 and 2 have been sensed for a period of 20 milliseconds or more (step 124). If either of the beams have been detected, then a problem likely exists with one of the emitter/detector pairs (3, 7 or 5, 9), a fault has occurred, and a response sequence is initiated (step 126). Here, again, travel of the lift truck 10 can be inhibited, and a signal, such as a message provided on display 55, can be provided for the operator.

The present invention therefore provides a means to reinforce training received by operators to maintain their feet and legs within a prescribed space envelope in an operator-standing lift truck by instituting a response sequence warning the operator that an object, such as a foot or leg of the operator, is extending through the opening 19 of the operator compartment 11. The response sequence is instituted only when the lift truck 10 is either known to be moving, or a request for movement has been received, therefore limiting the response sequence to conditions encountered while the vehicle is moving, and filtering out activations that occur when the vehicle is stopped and the operator is merely entering or exiting the vehicle normally. Moreover, the fault conditions can be counted and maintained in memory, and associated with a particular operator to provide a rating of the operator's driving of the vehicle. These ratings can be used, for example, to limit the speed of the vehicle for a particular driver, or to identify operators who require additional training. Various other uses for the rating information will be apparent to those of skill in the art.

The disclosed system, furthermore, provides a means for reinforcing the training of an operator to maintain his or her limbs inside of the vehicle, but does not impact operator positional flexibility and choice of foot position, allowing maintenance of comfort over extended operational periods.

The disclosed system also tailors the sensitivity of the emitter/detector producing beams 1 and 2 to provide individualized trigger levels. As described above, these trigger levels are tailored to detect portions of the operator's foot or leg. The beam 1, which is provided closest to the floor 21 of the compartment 11, is more easily accidentally triggered, and detects mainly the foot or toe extending from the vehicle. The detector 7 is provided with a comparatively longer delay period before activating the response sequence than the beam 2, which can detect a leg extending from the compartment 11. When an object extends into or out of the vehicle at a position above the floor 21, as detected by beam 2, the response sequence is activated quickly.

In addition, the emitter/detector pairs producing light beams 1 and 2 are monitored to detect possible equipment failures, providing a "self-test" to assure proper system operation. Because the emitter/detector pairs producing beams 1 and 2 are bi-stable, the sources 3 and 5 and detectors 7 and 9 have only two possible output conditions, on or off, and appropriate operation can be verified based on expected on/off conditions. When a light is not detected as expected, a fault condition can be assumed to exist in either the source 3 or 5 or the corresponding detector 7 or 9. The appropriate conditions for the sources 3 and 5 and detectors 7 and 9, moreover, can be provided in a state map and, in the event that one or both of the emitter/detector pairs producing beams 1 and 2 is determined to be in an inappropriate state, a defined response sequence can be initiated. As described above, the defined response can include slowing or stopping the lift truck 10, inhibiting travel of the lift truck 10, or providing a fault indicator to the display 55 (FIG. 2). All operating modes are tested during normal truck operation, regardless of whether the operator's foot or leg is in a position to block one of the beams.

Although an infrared emitter and detector pair has been described above, in alternative embodiments, the invention can be implemented using any of the following types of sensor devices:

Infrared sensor array. In this embodiments, a line of modulated infrared sources and proximity receivers can be provided, arranged a few degrees from vertical, pointing at an imaginary target above and behind the rear of the operator's compartment. An object impinging into the infrared beam pattern established by the array of infrared sources would reflect some amount of the energy back toward the infrared sensors, and this would be detected and acted upon.

E-field sensor. An E-field sensor comprising an electronic transmitting antenna, and corresponding receiving antenna could also be provided. This solution takes advantage of the fact that an object disposed within an electrostatic field changes the balance of the signal seen by an adjacent receiving antenna. The construction included a transmitting antenna and a receiving antenna, aligned below and behind the operator platform. An object, such as a foot, imposed into the beam pattern created by the transmitting antenna would impact the magnitude or phase of a signal received by a companion antenna. The steel structure of the truck itself would make the system immune to the operator within the compartment.

Full light curtain. An array of horizontally teamed transmitters and receivers can be positioned across the entrance 19 of the operator compartment I 1, effectively creating a series of beams vertically disposed from one another and from the floor 21 of the operator's compartment 19 by a small distance, such as, for example, 2 inches. The array defines the vertical area from compartment floor level up to, for example, 24", detecting any portion of the operator or other objects impinging upon one or more of the beam pairs.

Photoelectric System. The present invention can also employ a photoelectric system, comprising matched beam sources and receivers, to detect an operator's extremity beyond a designated area In other embodiments, a system whose philosophy rests with reinforcing training of an operator to maintain the operator's extremity is at specific points within the prescribed area, rather than outside of a prescribed area, can also be used. Furthermore, use of a self-test mechanism that validates operation of the system continuously as the truck is used, validating correct operation of the elements of the system repeatedly during normal vehicle operation, is also contemplated.

In addition, a plurality of sensors can be used, and discrete detection criteria and timing can be applied for each detector, thereby tailoring the responsivity of each to the target's velocity and length of time the respective beam would be interrupted, allowing a level of compliance commensurate with the operator's actions, and a reduction of false triggers.

It should be understood that the methods and apparatuses described above are only exemplary and do not limit the scope of the invention, and that various modifications could be made by those skilled in the art that would fall under the scope of the invention. To apprise the public of the scope of this invention, the following claims are made:

I claim:

1. A method for reinforcing the training received by an operator of a material handling vehicle to help maintain the operator's feet and legs in the vehicle, the method comprising the following steps:
   (a) mounting an emitter and a corresponding detector across an entry to the operator compartment;
   (b) monitoring a deadman brake to determine when the deadman brake has been released to allow travel of the vehicle;
   (c) determining whether the material handling vehicle has received a command to begin travel;
   (d) when the deadman brake is released and a travel request has been received, monitoring the detector to determine whether an object is extending between the emitter and the detector; and
   (e) activating a response sequence when the detector indicates that an object has been detected.

2. The method as recited in claim 1, wherein step (c) further comprises the step of monitoring a feedback signal indicating that the material handling vehicle is moving and step (d) further comprises the step of monitoring feedback from a traction motor to determine if the material vehicle is operating, and monitoring the detector to determine whether an object is extending between the emitter and the detector when the deadman brake is deactivated and the material handling vehicle is moving.

3. The method as recited in claim 1, wherein step (e) comprises the step of storing a fault occurrence in memory.

4. The method as recited in claim 3, further comprising the steps of receiving an operation identification from the operator of the vehicle, and of associating the fault occurrence with the operator identification.

5. The method as recited in claim 4, further comprising the step of calculating a rating for the operator based on the number of fault occurrences associated with the operator identification.

6. The method as recited in claim 1, wherein step (e) comprises braking the material handling vehicle.

7. The method as recited in claim 1, wherein step (e) comprises the step of providing at least one of an audio and a visual signal.

8. The method as recited in claim 1, wherein step (a) further comprises the steps of mounting a second emitter and a second detector corresponding to the second emitter across the entrance to the compartment, the second emitter and second corresponding detector being offset a distance above the emitter and corresponding detector.

9. The method as recited in claim 8, wherein step (a) further comprises the steps of mounting the emitter and the detector adjacent a floor of the compartment to a toe or foot of the operator, and mounting the second emitter and the second detector in a position above the floor of the compartment in a position selected to detect a leg of the operator.

10. The method as recited in claim 9, further comprising the step of delaying for a first predetermined period of time when the detector detects an object and for a second predetermined period of time when the second detector detects an object.

11. The method as recited in claim 10, wherein the second predetermined period of time is less than the first predetermined period of time to provide a quick response when a leg is extended from the vehicle.

12. A method for reinforcing the training received by an operator of a material handling vehicle to maintain the operator's feet and legs in the vehicle, the method comprising the following steps:
   (a) mounting a first emitter and a first corresponding detector to produce a first light beam across an entry to an operator compartment in the material handling vehicle adjacent a floor of the operator compartment to detect a toe or foot;
   (b) mounting a second emitter and a corresponding second detector across an entry to the operator compartment at a position above the first light beam to produce a second light beam positioned to detect a leg of the operator;
   (c) monitoring a deadman brake to determine when the deadman brake has been released to allow travel of the vehicle;
   (d) determining whether the material handling vehicle has received a command to begin travel;
   (e) when the deadman brake is released and a travel request has been received, monitoring the first and second detectors to determine whether an object is extending between at least one of the first emitter and the first detector or the second emitter and the second detector; and
   (f) counting the number of faults detected during operation and providing a rating of the operator based on the number of faults.

13. The method as recited in claim 12, further comprising the step of prompting the operator of the vehicle to enter an operator identifier before allowing the operator to drive the vehicle.

14. The method as recited in claim 12, wherein step (f) further comprises the step of delaying for a predetermined period of time and checking a state of the first and second detector to filter false triggers.

15. A material handling vehicle including an operator compartment, comprising:
   a deadman brake;
   a switch for deactivating the deadman brake;
   an emitter and a detector, the emitter and detector being coupled to opposing sides of an opening to the operator compartment and aligned such that a beam emitted by the emitter is received by the detector unless broken by an object extending through the opening;
   a traction motor for driving the vehicle and adaptable to provide a feedback signal indicating that the material handling vehicle is moving;
   a control handle for providing a travel request signal to the vehicle control system to drive the traction motor; and
   a vehicle control system, the vehicle control system being coupled to the switch to receive a signal indicating that the brake is to be deactivated, to the traction motor for receiving the feedback signal, and to the control handle for receiving the travel request signal, the vehicle control system being programmed to monitor an output of the detector when the deadman brake is deactivated, and at least one of the travel request signal and the feedback signals is active, and to institute a response when the output of the detector indicates that the beam is broken.

16. The material handling vehicle of claim 15, further comprising a second emitter and a second detector, the second emitter and second detector being positioned adjacent a floor of the operator compartment to monitor a toe of the operator as it extends from the compartment, the emitter and detector being offset at a distance above the second emitter and second detector and above the floor of the operator compartment.

17. The material handling vehicle of claim 16, wherein the vehicle control system is adapted to monitor the detector for a predetermined period of time before indicating a fault condition.

18. The material handling vehicle of claim 16, wherein the vehicle control system is adapted to monitor the second detector for a predetermined period of time before indicating a fault condition.

* * * * *

UNITED STATES PATENT AND TRADEMARK OFFICE
CERTIFICATE OF CORRECTION

PATENT NO. : 7,259,662 B2 Page 1 of 1
APPLICATION NO. : 11/143794
DATED : August 21, 2007
INVENTOR(S) : Robert J. Lewis It is certified that error appears in the above-identified patent and that said Letters Patent is hereby corrected as shown below:

Column 3, Line 54
"more filly below" should be
--more fully below--

Column 4, Line 52
"drive the tick," should be
--drive the truck,--

Column 8, Line 16
"embodiments," should be
--embodiment,--

Column 8, Line 39
"compartment I1," should be
--compartment 11,--

Signed and Sealed this

Sixth Day of November, 2007

JON W. DUDAS
*Director of the United States Patent and Trademark Office*